July 26, 1966    J. CRAWFORD, SR    3,262,713
GARBAGE CAN CART
Filed March 25, 1964
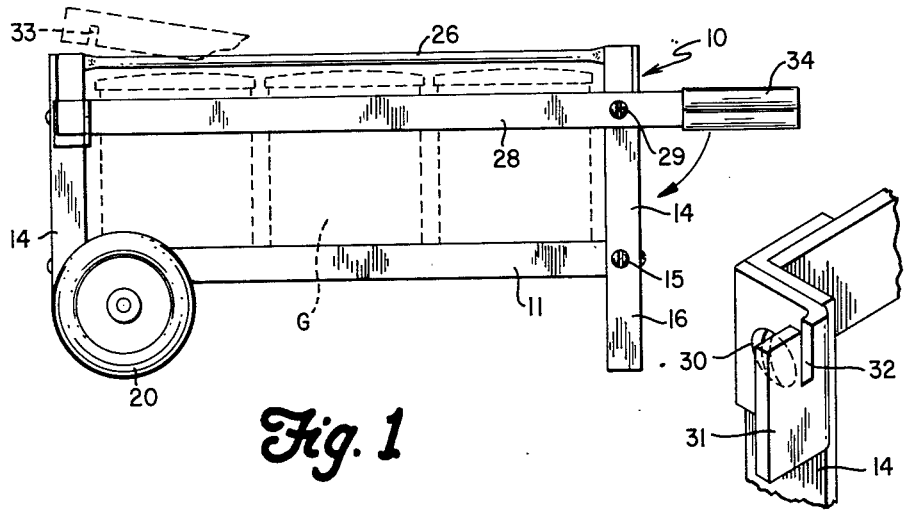
Fig. 1
Fig. 4
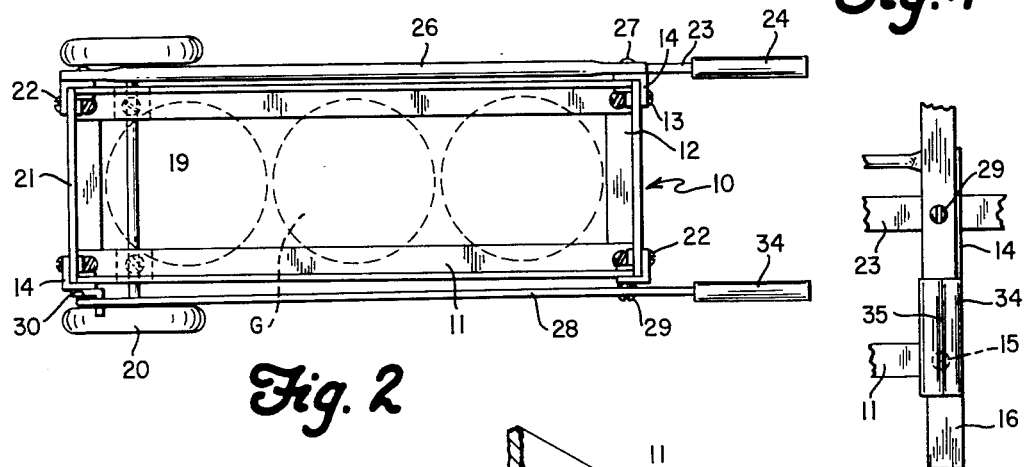
Fig. 2
Fig. 5
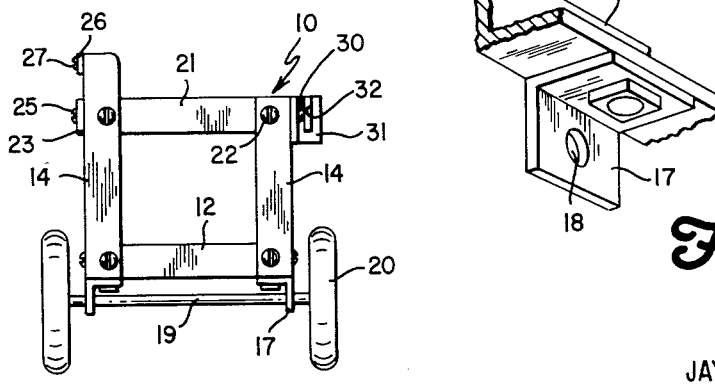
Fig. 3
Fig. 6
INVENTOR.
JAY CRAWFORD SR.
BY *Fraser & Fraser*
ATTORNEYS 3,262,713
Patented July 26, 1966

1

3,262,713
GARBAGE CAN CART
Jay Crawford, Sr., 340½ Willard St., Toledo, Ohio
Filed Mar. 25, 1964, Ser. No. 354,739
4 Claims. (Cl. 280—47.26)

This invention relates to utility carts but more particularly to garbage can carts by which the cans can be conveniently trundled from one place to another.

An object is to produce a cart of the above character which is equipped with handle bars by which a person may trundle the cart after the manner of a wheelbarrow, one of the bars being rockable from a position of use to a position affording relatively free access to the inside so as to facilitate the mounting and removal of cans without the necessity of lifting them to any great extent.

Other objects and advantages of the invention will hereinafter appear and for purposes of illustration but not of limitation an embodiment of the invention is shown on the accompanying drawings, in which FIGURE 1 is a side elevation of the garbage can cart;
FIGURE 2 is a top plan view thereof;
FIGURE 3 is a front end elevation thereof;
FIGURE 4 is an enlarged fragmentary perspective view showing the bracket for the front end portion of the rockable handle bar;
FIGURE 5 is a fragmentary side elevation showing the rockable handle bar in its upright or inoperative position; and
FIGURE 6 is an enlarged perspective view of one of the axle receiving brackets.

The illustrated embodiment of the invention comprises a garbage can cart having a body fabricated of metallic bars or strips which are secured together by bolt and nut assemblies, thereby providing a knock-down structure for enabling the same to occupy a small space for storage and transportation. The cart has a body 10 which is formed of a pair of laterally spaced longitudinally extending angle bars 11, one side of these bars being flatwise horizontally and the other side vertically disposed. The bars 11 constitute the floor of the cart and are connected together at opposite ends by relatively short angle bars 12, bolt and nut assemblies 13 connecting these parts together. At the corners are vertically extending angle bars 14, which are connected to the longitudinal bars 11 and cross bars 12 by bolt and nut assemblies 15 respectively. The pair of vertical angle bars 14 at the rear end of the cart have integral depending leg extensions 16, which are adapted to rest upon the ground when the cart is idle.

On the underside of each longitudinal angle bar 11, and spaced rearwardly from the front end of the cart, is an angle bracket 17 which may be welded in position. Each of these brackets has a depending portion provided with a hole 18 through which extends a transverse axle 19. Suitably fixed to the outer end portions of the axle 19 and arranged on the outside of the longitudinal bars 11 are rubber tired wheels 20, the front edges of which are about even with the front end of the cart.

Spaced vertically above the front cross piece 12 is a cross bar 21, which is secured to the adjacent corner angle irons 14 by bolt and nut assemblies 22. It will be observed that the cross bar 21 is disposed at the upper end of one of the corner bars 14 and the other corner bar extends upwardly above the bar 21, as best shown on FIGURE 3. A similar cross bar 21 is disposed at the rear end of the body where the corner bar arrangement is the same as at the front end.

One one side of the body, and arranged adjacent the upper end thereof, is a longitudinally extending handle bar 23, which is secured to the adjacent vertical bars 14 by bolt and nut assemblies. As shown on FIGURE 3

2 the handle bar 23 is in a vertical position similar to the adjacent cross bar 21 and this obtains at both ends of the cart. The handle bar 23 projects rearwardly of the cart body, as shown on FIGURE 2, and is provided with a handle grip 24 in the form of a double loop which may be formed by a pair of short tubes slitted and slipped over the free end portion of the handle bar. Spaced above the handle bar 23 is a longitudinally extending tie bar 26, which is tubular throughout except for the ends which are flattened. Bolt and nut assemblies 27 extend through the flat bar ends into the upper end portion of the adjacent corner angle bars 14, as best shown on FIGURES 1 and 3.

An important feature of this invention resides in providing a longitudinally extending handle bar 28 on the opposite side of the cart which is pivoted on a bolt 29 at the upper end portion of the adjacent angle bar 14. The bar 28 extends forwardly substantially the full length of the cart parallel to and in the same plane as the handle bar 23. At its front end portion the bar 28 is formed with a downwardly opening notch 33 as indicated by the broken lines on FIGURE 1. This notch is adapted latchingly to fit into and seat in an upwardly opening notch 32 in an angle bracket 31, which is fixed by a bolt and nut assembly 33' to the upper end of the adjacent corner bar 14. Similar to the handle bar 23, the rear end of the handle bar 28 projects rearwardly of the cart and has a similar double loop grip 34. A feature of the double loop grip is that not only is it a convenient hand hold but also provides a central groove or valley 35 disposed longitudinally of the bar 28.

In use a person grasps the grips 24 and 34 of the handle bars 23 and 28 and lifts the rear end portion of the cart so that it is supported on the wheels 20. In this manner the cart can be trundled from place to place. Since an upward force is exerted on the handle grip 34, the notched end 33 is forced snugly and tightly into the notch 32 of the bracket 31. When it is desired to mount garbage cans G or remove them from the cart, a downward pressure is exerted on the handle grip 34, causing the same to rock in a clockwise direction (FIGURE 1) until it is in a vertical position. In this position the handle grip 34 is forcefully moved over the bolt 15 which projects outwardly from the respective vertical angle bar 14 and enters the detent groove 35, thereby frictionally to hold the handle bar 28 in inoperative position. Thus the cooperation of the handle grip 34 and the bolt head 15 serves to retain the pivoted handle bar 28 in its upright position. When in this position convenient access can be had to the body of the cart and the garbage can G need only be lifted a short distance before it can be deposited on or removed from the floor of the cart. Thereafter the handle bar 28 may be rocked in a counterclockwise direction so that the notched end 33 may again enter the notch 32 of the bracket 31, thus to position the bar 28 in operative position for trundling the cart and retaining the cans in place.

Numerous changes in details of construction, arrangement and choice of materials may be effected without departing from the spirit of the invention especially as defined in the appended claims.

What I claim is:

1. A utility cart of the character described comprising a body structure, including spaced upright members, a pair of wheels at the front end portion of the body, a pair of rearwardly extending handle bars spaced laterally from each other for use in trundling the cart, said handle bars extending the full length of said body structure as well as rearwardly thereof, means for rigidly securing one handle bar to certain upright members of said body structure, a tie member adjacent said rigidly secured handle bar and secured to other upright members, a pivotal mounting for the rear end portion of the other handle bar, and a releasable latching connection between the front end portion of said pivoted handle bar and said body structure for enabling the respective handle bar to be rocked out of the way for loading and unloading the cart and, when in latching engagement, the same is firmly in position for trundling the cart.

2. A utility cart as claimed in claim 1 comprising cooperative means on the pivoted handle bar and the body structure for releasably retaining same in inoperative position.

3. A utility cart as claimed in claim 1 comprising a handle grip on the pivoted handle bar cooperating with a body structure member for frictionally holding such handle bar in inoperative position.

4. A utility cart as claimed in claim 1 in which the releasable latching connection comprises a notched bracket on the body structure and a notched end portion on the pivoted handle bar adapted for interengagement.

References Cited by the Examiner

UNITED STATES PATENTS

| | | | |
|---|---|---|---|
| 1,001,240 | 8/1911 | Beers | 280—47.37 |
| 2,744,763 | 5/1956 | Carter | 280—47.31 |
| 2,918,299 | 12/1959 | Lambert | 280—47.23 |
| 2,923,416 | 2/1960 | Vogel | 211—71 |

FOREIGN PATENTS 484,235  6/1952  Canada.

BENJAMIN HERSH, *Primary Examiner.*

J. A. PEKAR, *Assistant Examiner.*